United States Patent Office 3,485,846
Patented Dec. 23, 1969

3,485,846
BENZOCYCLOHEPTAIMIDAZOLES
Eugene E. Galantay, Mount Kemble Lake M.R. 18, Morristown, N.J. 07960
No Drawing. Continuation-in-part of application Ser. No. 690,381, Dec. 14, 1967. This application Apr. 1, 1968, Ser. No. 717,951
Int. Cl. C07d 49/36; A61k 27/00
U.S. Cl. 260—293        12 Claims

ABSTRACT OF THE DISCLOSURE

This disclosure pertains to 2,4 di-substituted benzo-[5,6]cyclohepta[1,2-d]imidazoles, e.g., 2-methyl-4(1'-methyl - 4' piperidylidene) - 1,4,9,10 - tetrahydrobenzo-[5,6]-cyclohepta-[1,2-d]-imidazole. These compounds are useful as antihistaminics, anti-cholinergic agents, and tranquilizers.

---

This application is a continuation-in-part of application Ser. No. 690,381, filed Dec. 14, 1967, now abandoned, which in turn is a continuation-in-part of application Ser. No. 650,216, filed June 30, 1967, now abandoned.

This invention relates to tricyclic compounds. In particular, the invention pertains to benzocycloheptaimidazoles, acid addition salts thereof, and methods for preparing the same. The invention also relates to intermediates which are useful in preparing the above compounds and processes for preparing said intermediates.

The benzocycloheptaimidazoles of the present invention may be represented structurally as follows:

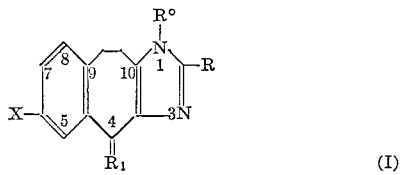

wherein

R represents loweralkyl, preferably containing from 1 to 4 carbon atoms, e.g., methyl, ethyl, propyl and butyl;
R° represents H or loweralkyl, the loweralkyl group preferably containing from 1 to 4 carbon atoms, e.g., methyl, ethyl, propyl, isoproyl and butyl;
$R_1$ represents

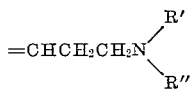

or 1-loweralkyl-4-piperidylidene, where loweralkyl is as previously defined.
R' and R'' each, independently, represent loweralkyl, preferably containing from 1 to 4 carbon atoms, e.g., methyl, ethyl, propyl and butyl; and
X represents hydrogen or halo, preferably having an atomic weight of 35 to 80, i.e., bromo or chloro.

The compounds of structural Formula I may be prepared by removing the elements of water from a corresponding 4-hydroxy benzocycloheptaimidazole (II). This process may be represented as follows:

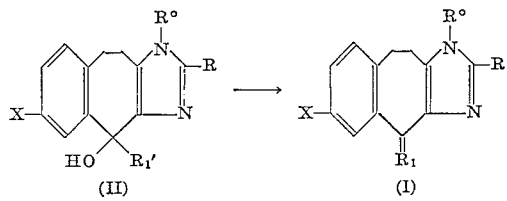

where
$R_1'$ represents

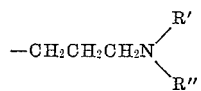

or 1-loweralkyl-4-piperidyl, and
R, R°, $R_1$, R', R'' and X are as previously defined.

The process for preparing the compounds of Formula I indicated above is conducted in a manner similar to those described in the prior art for the preparation of other tricyclic benzocycloheptane compounds. For instance, this above shown process may be effected by heating the compounds of Formula II with alcoholic hydrogen chloride or other strongly acidic media such as phosphorous oxychloride, sulfuric acid, and the like. The process is preferably conducted in a suitable inert organic solvent such as chloroform, methylene chloride, and the like. The reaction temperature is about 50° C.–120° C.

The above described process provides stereoisomeric mixtures of the compounds of Formula I. The respective isomers can be isolated by known processes, e.g., fractional distillation, and are included within the scope of the present invention. Although the mixture exhibits the pharmacological properties discussed herein, it should be understood that in some instances the activity of one isomer may be somewhat greater than the activity of the other isomer.

The process for preparing the compounds of Formula II comprises treating a 2-lower alkyl-9,10-dihydro-4H-benzo[5,6]cyclohepta[1,2-d]oxazol-4-one with a loweralkyl amine or ammonia, depending upon whether a 1-substituted or 1-unsubstituted material products (I) is desired, treating the resulting cycloheptaimidazol-4-one with a metallo halide Grignard reagent containing the desired $R_1$ moiety, and hydrolyzing the resulting Grignard adduct to form a compound of Formula II. This process may be illustrated as follows:

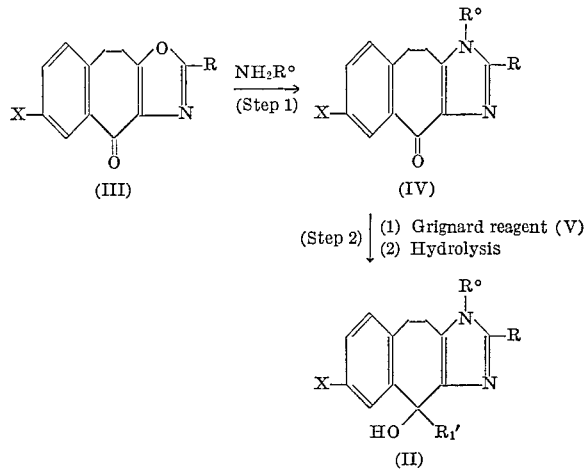

where R, R°, $R'_1$ and X are as earlier defined.

In Step 1 of the process described above, the benzocycloheptaoxazol-4-one (III) is converted to the benzocycloheptaimidazol-4-one (IV) by treatment with an appropriate mono-alkyl amine or ammonia. The reaction is carried out in the conventional manner and the particular conditions employed will normally be dependent upon the nature and reactivity of the amine (or ammonia). In general, the reaction is carried out at an elevated temperature of from about 80° to about 160° C. and at atmospheric pressure where an amine used is liquid at the reaction temperature, or at elevated pressure when ammonia is used or when the amine used is a gas at the reaction temperature. The preferred reaction temperature is from about 110° to about 130° C. The reaction may be carried out in a suitable inert organic solvent if desired. However, when the amine employed is a liquid under the reaction conditions, the use of a solvent is not necessary since an excess of the amine may be used for this purpose. Those solvents which may be used include tetrahydrofuran and aromatic hydrocarbons such as toluene. The product (IV) is recovered using conventional techniques.

When the compounds of Formula IV are such that R° is hydrogen, certain additional procedures are necessary before Step 2 indicated above may be performed. In such instance, it becomes necessary to protect said hydrogen atom in order to insure that the compound of Formula II will also contain hydrogen as the substituent designated R° thereon. This procedure involves the treating of the compound of Formula IV with a trimethylsilyl transfer reagent such as trimethyl chlorosilane or O,N bis-trimethylsilylacetamide. This reaction is conducted, by admixing said transfer reagent and the 1-unsubstituted benzocycloheptaimidazole-4-one of Formula IV at a temperature of about −20 to 60° C. in a halogenated hydrocarbon such as chloroform. The reaction is conveniently conducted at about 0° C.–room temperature for about 8–48 hours. The resultant product is substituted at the 1-position with a silicon containing moiety. For instance, when O,N bis-trimethylsilylacetamide is used as the transfer reagent, the resulting intermediate would be substituted at the one position with a trimethylsilyl substituent. This silicon containing intermediate may be used directly for the reaction with the Grignard reagent (Step 2) and the remaining procedure is as described below for that process step.

In accordance with a still further aspect of this invention, compounds like those of Formula IV are prepared where X and R are as designated previously and R° represents benzyl, and the procedure used is that as described for Step 1 above except that benzylamine is used as the amine reactant. For convenience, all such like compounds are represented by Formula IVa

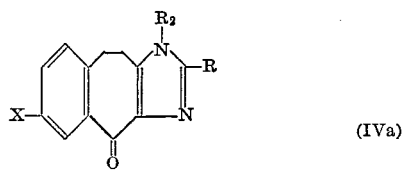

(IVa)

where R and X are defined above, and $R_2$ represents H, benzyl or loweralkyl, as earlier defined.

In Step 2 of the process for preparing compounds (II), the tricyclic ketone (IV) is condensed with the metallo halide Grignard reagent (V) and the resulting Grignard adduct is then hydrolyzed to form the corresponding carbinol (II). The preparation of the Grignard reagent (V), the condensation thereof with compound (IV) and the subsequent hydrolysis of the resulting Grignard adduct are all carried out in the same manner as has previously been described in the prior art for the preparation of the dibenzocycloheptene type tricyclic compounds. Accordingly, the Grignard reagent (V) may be prepared by the reaction of an appropriate metal, e.g. magnesium, with an ethereal solution of an halide conveniently designated $R_1$ Hal (VI). The preferred Grignard reagent is a $R_1'$ magnesium halide such as the $R_1'$ magnesium chloride or $R_1'$ magnesium bromide. Condensation of the Grignard reagent (V) with the tricyclic ketone (IV) is effected at about −20° C. to 20° C. in an inert organic solution, e.g., absolute diethyl ether, benzene or tetrahydrofuran. After the condensation has been effected, the Grignard adduct is hydrolytically decomposed at about 0° C. under practically neutral conditions, e.g., by hydrolysis in aqueous ammonium chloride solution.

The compounds (III) employed as starting materials in the process described hereinabove are prepared by first nitrosating a 6,7,8,9 - tetrahydro-5H-benzocyclohepten-5-one (VII) to form the corresponding 6-isonitroso-6,7,8,9-tetrahydro-5H-benzocyclohepten-5-one (VIII) and then treating the latter with an appropriate alkanoylating agent in the presence of a strong acid. This process may be illustrated as follows:

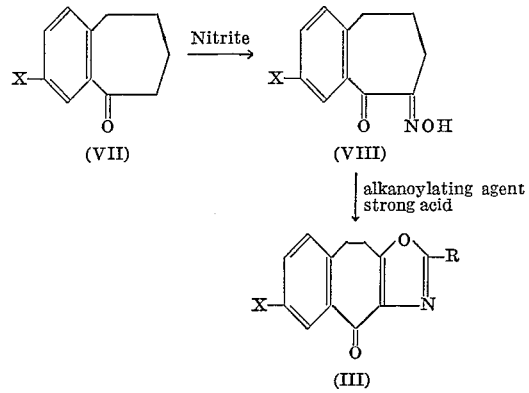

wherein X and R are as previously defined.

The nitrosation is conveniently effected in conventional manner employing an appropriate inert organic solvent, e.g., benzene, toluene and diethyl ether, and a nitrite, preferably a loweralkyl nitrite, e.g., ethyl nitrite and butyl nitrite. Preferably, the reaction is carried out at room temperature (20° C.) or below and in the presence of a strong anhydrous acid or base, such as hydrochloric acid or sodium methoxide, respectively. The 6,7,8,9-tetrahydro-5H-benzocyclohepten-5-ones (VII) employed in the above process are either known and can be prepared as described in the literature or they can be prepared from available materials in analogous manner to that described in the literature for the preparation of the known compounds.

The 6-isonitroso-6,7,8,9-tetrahydro - 5H-benzocyclohepten-5-one (VIII) is converted to the benzocycloheptaoxazol-4-one (III) by treatment with an appropriate alkanoylating agent in the presence of a strong acid. Suitable alkanolylating agents include the loweralkanoic acids, e.g., acetic acid, propionic acid and butyric acid, the corresponding acid anhydrides thereof, e.g., acetic anhydride, propionic anhydride and butyric anhydride, mixtures of lower alkanoic acids and their corresponding anhydrides, e.g., acetic acid and acetic anhydride, propionic acid and propionic anhydride and butyric acid and butyric anhydride, loweralkanoyl halides, e.g., acetyl chloride, propionyl chloride and butyryl chloride, and mixture of alkanoyl halides with the corresponding alkanoic acids and/or anhydrides such as mentioned above. The strong acid employed is a hydrohalic acid, preferably hydrochloric acid. The strong acid should be employed in an amount such that the reaction mixture is strongly acidic. Desirably, the reaction is carried out in the presence of at least 2 moles of strong acid per mole of the isonitroso compound. Preferably from 2.5 to 3 moles of strong acid per mole of isonitroso compound are employed. It is further desirable that the acidity of the reaction mixture is such that an aliquot portion thereof when diluted with water (1:10) gives a pH reading of not higher than 2 and preferably is in the range of from 0.5 to 1.5. The reaction can be carried out in an inert organic solvent if desired. However, the use of a solvent is not necessary since an excess of the alkanoylating agent can be employed for this purpose. If a solvent is employed, the choice thereof is not critical and any inert organic solvent conventionally used with alkanoylating agents of the type mentioned above can be employed. Similarly, the temperature at which the reaction is effected is not critical. In general, it is desirable to carry out the reaction at an elevated temperature of from about 60° C. to about 150° C. Preferably, the reaction is carried out at a temperature of from 80° C. to about 110° C. In most instances, the resulting product separates as a solid, when the reaction mixture is poured over ice or diluted with water, and can be recovered by filtration and further purified by crystallization in conventional manner. When the product separates an oil, it can be readily extracted with a suitable solvent, e.g., benzene, and further purified by conventional techniques.

All the benzocycloheptaimidazoles represented by Formula I above are useful because they possess pharmacological activity in animals. In particular, all such compounds are useful as anti-ulcer/anti-spasmodic agents as indicated by their activity in dog given 1–10 mg./kg. of active agent and tested by noting blood pressure response to vagal stimulation conducted in standard fashion. The blood pressure is measured with the aid of a mercury manometer or transducer via a catheter inserted in the carotid or femoral artery. Said compounds of Formula I substituted at the 1-position where R, R° and X are as otherwise earlier defined also possess anti-cholinergic activity as indicated by their activity in Guinea Pig Ilium (Tyrode, Arch. Pharmacodyn, 20:205, 1910). Additionally, the compounds of Formula I are useful as anti-histaminic agents as indicated by their activity in Guinea Pig Ilium (Tyrode, as above). Said compounds are also useful as antiserotonin agents as indicated by their activity in anesthetized guinea pigs intravenously given about 0.5 mg./kg. of active compound and tested according to the method of Konzett and Rogsler (Arch. Exp. Path. und Pharmak. 195:71, 1940). Moreover, those compounds of Formula I unsubstituted at the 1-position and R, R° and X are as earlier defined are useful as tranquilizers. This is indicated by their activity in mouse given 100 mg./kg. of active compound and tested using a 30 word adjective check sheet method basically as described by Irwin, S. (Gordon Research Conference, Medicinal Chemistry, 1959), and Chen (Symposium on Sedative and Hypnotil Drugs, Williams and Wilkins, 1954).

For these used, the compounds may be combined with one or more pharmaceutically acceptable carriers or adjuvants. They may be administered orally or parenterally and, depending upon the compound employed and the mode of administration, the exact dosage utilized may vary. Furthermore, compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate and the like.

In general, satisfactory results are obtained when these compounds are administered for the anti-ulcer/anti-spasmodic use, at a daily dosage of about 0.1 milligrams to about 5 milligrams per kilogram of animal body weight. This daily dosage is preferably 2 to 4 times a day, or in sustained release form. For most large mammals, the total daily dosage is from about 10 milligrams to about 150 milligrams. Dosage forms suitable for internal use comprise from about 2.5 milligrams to about 75 milligrams of the active compound in intimate admixture with a solid or liquid pharmaceutically acceptable carrier or diluent. Repeating the tranquilizer use, satisfactory results are obtained when the compounds indicated are administered at a daily dosage of about 1–100 milligrams per kilogram of animal body weight, administered 2–4 times a day, or in sustained release form. For most large mammals, the total daily dosage is from about 100–500 milligrams, whereas dosage forms suitable for internal use comprise from about 25 milligrams to about 250 milligrams of the active compound in intimate admixture with a solid or liquid pharmaceutically acceptable carrier or diluent. When the compounds indicated above are used as anti-histamine agents, anti-serotonin agents, or anti-cholinergic agents, they can be used in the same manner as promethazine, a known therapeutic drug. The internal administration of these compounds (I) and the daily dosage administered is of the same manner and order, respectively, as that for promethazine. Appropriate dosage froms can be prepared accordingly.

A representative formulation suitable for oral administration for the indicated uses is a tablet prepared by standard tabletting technique which contains the following:

| Ingredient: | Parts by weight |
|---|---|
| 2 - methyl - 4-(3-dimethyl-aminopropylidene)- 9,10 - dihydro - 4H - benzo[5,6] - cyclohepta [1,2-d]imidazole (or corresponding 1-methyl compound) | 30 |
| Tragacanth | 2 |
| Lactose | 59.5 |
| Corn starch | 5 |
| Talcum | 3 |
| Magnesium stearate | 0.5 |

The novel compounds represented by Formula IVa also exhibit pharmacological activity in animals. In particular, such compounds possess CNS stimulant activtiy and analeptic activity as indicated by their activity in mouse tested using the 30 word adjective check sheet method indicated above, and by a hexobarbital interaction test on mice give 100 mg./kg. of active substance and tested using substantially the method disclosed by Winter (J. Pharmacol. & Exp. Therap., 94:7, 1948). For such use, these compounds or their non-toxic pharmaceutically acceptable acid addition salts, like those indicated for the compounds of Formula I, may be admixed with conventional pharmaceutical carriers or diluents and administered internally in the form of tablets, capsules, elixirs, solutions or suspensions. The dosage administered will, of course, vary depending upon the compound employed and mode of administration. However, in general, satisfactory results are obtained when administered at a daily dosage of from about 5 milligrams per kilogram of body weight to about 50 milligrams per kilogram of body weight preferably given in divided doses 2 to 4 times a day or in sustained release form. For the larger mammals as well as the smaller domestic mammals, the total daily dosage is from about 400 to 1000 milligrams, whereas dosage forms suitable for internal administration comprise from about 100 milligrams to about 500 milligrams of the compound admixed with a solid or liquid pharmaceutical carrier or diluent. A representative formulation is a tablet (prepared by standard tabletting procedures) and containing the following ingredients:

| Ingredient: | Parts by weight |
|---|---|
| 1,2 - dimethyl - 9,10 - dihydro - 4H - benzo [5,6]cyclohepta[1,2-d]imidazol-4-one | 50 |
| Tragacanth | 2 |
| Lactose | 39.5 |
| Corn starch | 5 |
| Talcum | 3 |
| Magnesium stearate | 0.5 |

The following examples are provided for the purpose of illustration and not by way of limitation. They are not intended so as to limit the scope of the invention.

EXAMPLE 1

1,2 - dimethyl - 4 - (3-dimethylaminopropylidene) - 9,10-dihydro - 4H - benzo[5,6]cyclohepta[1,2-d]imidazole

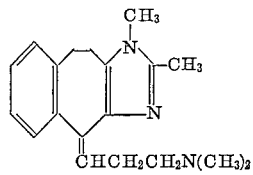

Step A.—Preparation of 6-isonitroso-6,7,8,9-tetrahydro-5H-benzocyclohepten-5-one: To a solution of 50 g. of 6,7,8,9-tetrahydro-5H-benzocyclohepten-5-one in 210 ml. of 0.35 N absolute ethereal hydrochloric acid is added, over a period of 15 minutes, 32.2 g. of n-butyl nitrite while maintaining the temperature of the reaction mixture between 15°–20° C. (by external cooling). After crystallization commences petroleum ether is added and the resulting crystalline material filtered off and washed with petroleum ether to obtain 6-isonitroso-6,7,8,9-tetrahydro-5H-benzocyclohepten-5-one; M.P. 139–141° C.

Step B.—Preparation of 2-methyl-9,10-dihydro-4H-benzo[5,6]cyclohepta[1,2-d]oxazol - 4 - one: Hydrogen chloride gas is passed through a mixture of 45 ml. of glacial acetic acid and 7.8 ml. of acetic anhydride for 15 minutes while maintaining the temperature of the mixture at 100° C. Thereafter 2.997 g. of 6-isonitroso-6,7,8,9-tetrahydro-5H-benzocyclohepten-5-one is immediately added while containing the passage of hydrogen chloride gas through the mixture and maintaining the reaction temperature at 100° C. during the addition of the ketone and for an additional 15 minutes thereafter. The resulting mixture is then poured over ice containing 45 g. of sodium carbonate. The resulting solids are then recovered by filtration, washed first with water and then with small amounts of ethyl acetate and then dried to obtain 2-methyl-9,10-dihydro - 4H - benzo[5,6]cyclohepta[1,2 - d]oxazol-4-one; M.P. 174–176° C.

Step 1.—Preparation of 1,2-dimethyl-9,10-dihydro-4H-benzo[5,6]cyclohepta[1,2-d]imidazol-4-one: A mixture of 10.15 g. of 2-methyl-9,10-dihydro-4H-benzo[5,6]cyclohepta[1,2-d]oxazol-4-one and 300 ml. of liquid methylamine is heated in an autoclave at 120° C. for three hours. The mixture is then cooled, the excess methylamine allowed to evaporate off and the residue dissolved in 27 ml. of 2 N hydrochloric acid. The acidic solution is treated with 21 ml. of 5 N sodium hydroxide, then extracted three times with 50 ml. (each) of chloroform and the combined chloroform extracts dried over sodium sulfate and concentrated to about 40 ml. The concentrate is then treated with 8 ml. of a 5 N isopropanolic solution of hydrochloric acid and the crystalline product which forms filtered off and washed twice with 20 ml. (each) of chloroform and then dried to obtain 1,2-dimethyl-9,10-dihydro-4H-benzo[5,6]cyclohepta[1,2-d]imidazol-4-one hydrochloride; M.P. 263 265° C. The free base, M.P. 134–135° C., is obtained by treating the hydrochloride with sodium hydroxide in conventional manner.

Step 2.—Preparation of 1,2 - dimethyl-4-(3-dimethylaminopropyl) - 4 - hydroxy-9,10-dihydro-4H-benzo[5,6]cyclohepta[1,2,-d]imidazole: To a Grignard mixture, prepared in conventional manner by reacting 1.5 g. of magnesium with 7.4 g. of 3-dimethylaminopropyl chloride in 30 ml. of tetrahydrofuran, is added at 0° C. with stirring, a solution of 6.0 g. of 1,2-dimethyl-9,10-dihydro-4H-benzo[5,6]cyclohepta[1,2 - d]imidazol - 4-one in 45 ml. of tetrahydrofuran. The mixture is allowed to stand at room temperature for 45 minutes and there is added, while chilling, 40 ml. of a saturated ammonium chloride solution. The resulting mixture is made strongly basic (pH 13) with 10 N sodium hydroxide and then extracted with chloroform to obtain 1,2-dimethyl-4-(dimethylaminopropyl)-4-hydroxy - 9,10 - dihydro-4H-benzo[5,6]cyclohepta[1,2-d] imidazole as an oil.

Last step.—Preparation of 1,2-dimethyl-4-(3-dimethylaminopropylidene) - 9,10 - dihydro-4H-benzo[5,6]cyclohepta[1,2-d]imidazole: The product obtained in Step 2 is refluxed for 60 minutes with 50 ml. of 5 N ethanolic hydrochloric acid and the resulting mixture evaporated to dryness. The residue is dissolved in 100 ml. of water and the resulting solution washed several times with ethyl acetate to remove any by-products. The aqueous phase is then made strongly basic (pH 13) by the addition of 10 N sodium hydroxide and extracted three times with 50 ml. (each) of methylene chloride. The combined methylene chloride extracts are washed several times with 30 ml. (each) of water, then dried over sodium sulfate and evaporated. The residue is treated with 10 ml. of petroleum ether-diethyl ether (1:1) and the solids filtered off to obtain 1,2 - dimethyl-4-(3-dimethylaminopropylidene)-9,10-dihydro - 4H - benzo[5,6]cyclohepta[1,2 - d]imidazole; M.P. 112–115° C.

When the above procedure is used and 7-chloro-6,7,8,9-tetrahydro - 5H - benzocyclohepten-5-one or 7-bromo-6,7,8,9 - tetrahydro - 5H-benzocyclohepten-5-one is used in place of 6,7,8,9- - tetrahydro - 5H-benzocyclohepten-5-one, there is obtained 6 - chloro-1,2-dimethyl-4-(3-dimethylaminopropylidene) - 9,10 - dihydro-4H-benzo[5,6]-cyclohepta[1,2-]imidazole or 6 - bromo - 1,2-dimethyl-4-(3-dimethylaminopropylidene) - 9,10 - dihydro-4H-benzo[5,6]cyclohepta[1,2-d]imidazole, respectively.

EXAMPLE 2

2-Methyl-4-(1'-methyl-4'-piperidylidene)-1,4,9,10-tetrahydrobenzo[5,6]cyclohepta[1,2-d]-imidazole

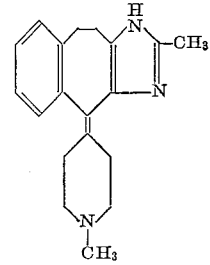

Step 1.—2 - methyl-1,4,9,10-tetrahydrobenzo[5,6]cyclohepta[1,2-d]imidazol-4-one: A mixture of 30.0 g. of 2-methyl - 9,10 - dihydro-4H-benzo[5,6]cyclohepta[1,2-d] oxazol-4-one and 700 ml. of liquid ammonia is autoclaved for 15 hours at 115° C. The ammonia is allowed to escape and residue (35 g.) is refluxed with 10 ml. of chloroform for 30 minutes. After cooling, 13.5 g. of a solid (M.P. (197)–200–203° C. dec.) is filtered off and washed 3 times with 20 ml. each of cold chloroform.

The unified chloroform solutions are evaporated to dryness and the residue is crystallized from 170 ml. of benzene. 17.2 g. of the 2 - methyl-1,4,9,10-tetrahydrobenzo[5,6]cyclohepta[1,2 - d]imidazol-4-one is obtained; M.P. 203–203.5° C.

Step 2.—2 - methyl - 4-hydroxy-4-(1'-methyl-4'-piperidyl) - 1,4,9,10 - tetrahydrobenzo[5,6]cyclohepta[1,2-d]-imidazole: To a solution of 8.50 g. of 2-methyl-1,4,9,10-tetrahydrobenzo[5,6]cyclohepta[1,2 - d]imidazol-4-one in 43 ml. of dry chloroform, there is added dropwise 10.0 g. of O,N bis-trimethylsilyl-acetamide and the mixture thus obtained is allowed to react at room temperature for 24 hours. The chloroform and other volatiles are then removed in vacuo to give 12 g. of the crude 2-methyl-1-trimethylsilyl - 1,4,9,10 - tetrahydrobenzo[5,6]cyclohepta[1,2-d]imidazol - 4-one (white solid) which is later used without further purification.

To 280 ml. of a Grignard mixture, prepared from magnesium, 1-methyl-4-chloropiperidine and tetrahydrofuran and containing by titration, 0.11 g. moles of the reagent, there is added, at 0° C., 11.8 g. of 2-methyl-1-trimethylsilyl-1,4,9,10 - tetrahydrobenzoyl[5,6]cyclohepta[1,2-dimidazol-4-one. After 18 hours at room temperature, 300 ml. of saturated aqueous ammonium chloride solution is added. The temperature is maintained at 5–10° C. with external cooling. The tetrahydrofuran layer is separated and the aqueous phase is extracted (three times, 50 ml.) with ether. The unified, dried organic layers are evaporated to give 15.8 g. of residue which on crystallization with 150 ml. of ether, gives 10.01 g. of 2-methyl-4-hydroxy-4-(1'-methyl-4' - piperidyl)-1,4,9,10-tetrahydrobenzo[5,6]cyclohepta [1,2-d]-imidazole; M.P. 224–225° C.

Last step. — 2-methyl-4-(1'-methyl-4'-piperidylidene)-1,4,9,10 - tetrahydrobenzoyl[5,6]cycloheptal[1,2-d] imidazole: Into a mixture of 11.65 g. of 2 - methyl - 4 - hydroxy - 4 - (1' - methyl - 4' - piperidyl) - 1,4,9,10-tetrahydrobenzo [5,6]cyclohepta[1,2 - d] - imidazole, 47 ml. of glacial acetic acid and 29 ml. of acetic anhydride, there is introduced hydrogen chloride to saturation; the mixture is then kept at 120° C. for 4 days. After evaporation to dryness in vacuo, the residue is dissolved in water. At pH 1, the solution is washed with ethyl acetate; then the pH of the aqueous phase is adjusted to pH 10 by the addition of sodium hydroxide solution, whereupon crude 2-methyl-4 - (1' - methyl-4'-piperilydene)-1,4,9,10-tetrahydrobenzo [5,6]cyclohepta[1,2-d]imidazole precipitates (10.11 g.). A portion of the precipitate (2.60 g.) is recrystallized from methanol to obtain 2 - methyl-4-(1'-methyl-4'-piperilydene) - 1,4,9,10 - tetrahydrobenzo[5,6]cyclohepta[1,2-d] imidazole which melts with decomposition at 229–230° C.

To prepare the crystalline fumaric acid salt of the above compound, the amorphous base is dissolved in 70 ml. of warm ethanol and the solution is mixed with 4.0009 g. of fumaric acid. Soon after dissolution of the latter, the 1:1 fumaric acid salt of 2-methyl-4-(1'-methyl-4'-piperidylidene )- 1,4,9,10 - tetrahydrobenzoyl[5,6]cycloheptal[1,2-d]-imidazole crystallizes; M.P. 215–218° C.

EXAMPLE 3

1,2-dimethyl-4-(1'-methyl-4'-piperidylidene)-1,4,9,10-tetrahydrobenzo[5,6]cyclohepta[1,2-d]imidazole

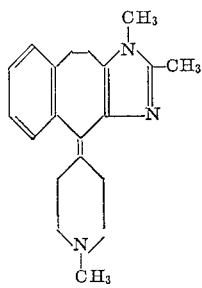

Step 1.—1,2-dimethyl-4-hydroxy-4-(1'-methyl-4'-piperidyl) - 1,4,9,10 - tetrahydrobenzo[5,6]cyclohepta[1,2-d] imidazole: 10.0 g. of 1,2-dimethyl-1,4,9,10-tetrahydrobenzo[5,6]cyclohepta[1,2-d]imidazol-4-one is added to 200 ml. of a Grignard mixture prepared from magnesium, 1-methyl-4-chloropiperidine and tetrahydrofuran (0.0852 moles of reagent) at 0° C. After 18 hours at room temperature, 300 ml. of saturated aqueous ammonium chloride solution is added. The temperature is maintained at 5–10° C. with external cooling. The tetrahydrofuran layer is separated and the aqueous phase is extracted with 50 ml. of ether three times. The unified, dried organic layers are evaporated to give a residue which, on crystallization with 150 ml. of ether provides solid 1,2-dimethyl-4-hydroxy - 4 - (1'-methyl-4'-piperidyl)-1,4,9,10-tetrahydrobenzo[5,6]cyclohepta[1,2 - d] - imidazole; M.P. 199–201° C.

Last step.—1,2 - dimethyl - 4-(1'-methyl-4'-piperidylidene)1,4,9,10 - tetrahydrobenzo[5,6]cyclohepta[1,2 - d] imidazole: A mixture of 6.75 g. of 1,2-dimethyl-4-hydroxy - 4 - (1'-methyl-4'-piperidyl)-1,4,8,10-tetrahydrobenzo[5,6]cyclohepta[1,2-d]-imidazole, 26 ml. of glacial acetic acid and 16 ml. of acetic anhydride is treated with gaseous hydrogen chloride to saturation. The mixture is maintained at 120° C. for 4 days. After evaporation to dryness in vacuo, the residue is dissolved in water. The solution is washed at pH 1 with ethyl acetate and the pH of the aqueous phase is adjusted to pH 10 by addition of sodium hydroxide solution whereupon crude amorphous 1,2-dimethyl-4-(1'-methyl-4'-piperidylidene)-1,4,9,10 - tetrahydrobenzo[5,6]-cyclohepta[1,2-d]imidazole precipitates. Recrystallization from methanol provides substantially pure product; M.P. 251–252° C. with decomposition.

A portion of the crude amorphous solid (7.35 g.) is converted into crystalline 1:1 fumaric acid salt, by adding 2.644 g. of fumaric acid to its solution in 70 ml. of warm ethanol, whereupon the salt crystallizes; M.P. 205–207° C.

EXAMPLE 4

1-benzyl-2-methyl-1,4,9,10-tetrahydrobenzo[5,6]cyclohepta[1,2-d]imidazol-4-one

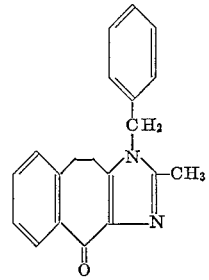

A mixture of 12.02 g. of 9,10-dihydro-2-methyl-4H-benzo[5,6]cyclohept[1,2-d]oxazol-4-one and 50 ml. of benzylamine is maintained at 120° C. for 140 minutes. Thereafter, the excess benzylamine is removed by steam distillation. The residue is taken up in chloroform (200 ml.), dried over sodium sulfate, and the filtered clear solution is evaporated to dryness. The oily residue is crystallized with 50 ml. of ether to give the title product; M.P. 142–144° C.

What is claimed is:
1. A benzocycloheptaimidazole of the formula

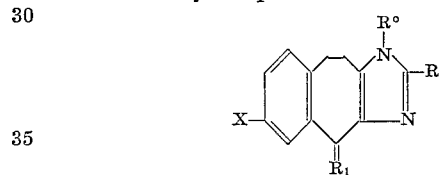

or a pharmaceutically acceptable acid addition salt thereof, wherein
R represents loweralkyl;
R° represents H or loweralkyl;
$R_1$ represents

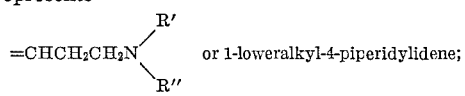

or 1-loweralkyl-4-piperidylidene;
R' and R'' each, independently, represents loweralkyl; and
X represents hydrogen or halogen.

2. The compound of claim 1 which is 1,2-dimethyl-4-(3 - dimethylaminopropylidene) - 9,10-dihydro-4H-benzo[5,6]cyclohepta[1,2-d]imidazole.

3. The compound of claim 1 which is 2-methyl-4-(1'-methyl-4'-piperidylidene) - 1,4,9,10 - tetrahydrobenzo[5,6]cyclohepta[1,2-d]-imidazole.

4. The compound of claim 1 which is 1,2-dimethyl-4-(1'-methyl - 4' - piperidylidene) - 1,4,9,10 - tetrahydrobenzo[5,6]cyclohepta[1,2-d]-imidazole.

5. A compound of the formula

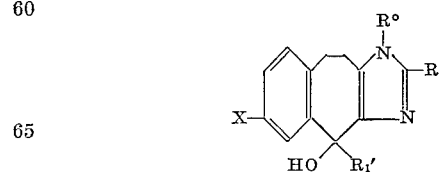

or an acid addition salt thereof, wherein
R represents loweralkyl;
R⁰ represents H or loweralkyl;
$R_1'$ represents

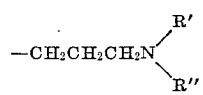

or 1-loweralkyl-4-piperidyl;

R′ and R″ each, independently, represent loweralkyl; and

X represents hydrogen or halogen.

6. The compound of claim 5 which is 1,2-dimethyl-4-(3 - dimethylaminopropyl) - 4 - hydroxy-9,10-dihydro-4H-benzo[5,6]cyclohepta[1,2-d]imidazole.

7. The compound of claim 5 which is 2-methyl-4-hydroxy - 4 - (1′-methyl-4′-piperidyl)-1,4,9,10-tetrahydrobenzo[5,6]cyclohepta[1,2-d]-imidazole.

8. The compound of claim 5 which is 1,2-dimethyl-4-hydroxy - 4 - (1′-methyl-4′-piperidyl)-1,4,9,10-tetrahydrobenzo[5,6]cyclohepta[1,2-d]-imidazole.

9. A compound of the formula

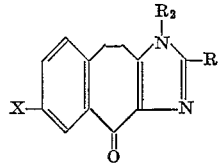

or a pharmaceutically acceptable acid addition salt thereof, wherein

R represents loweralkyl;

$R_2$ represents H, benzyl or loweralkyl; and

X represents hydrogen or halogen.

10. The compound of claim 9 which is 1,2-dimethyl-9,10-dihydro - 4H - benzo[5,6]cyclohepta[1,2-d]imidazol-4-one.

11. The compound of claim 9 which is 2-methyl-1,4,9,10 - tetrahydrobenzo[5,6]cyclohepta[1,2 - d]imidazol-4-one.

12. The compound of claim 9 which is 1-benzyl-2-methyl-1,4,9,10-tetrahydrobenzo[5,6]cyclohepta[1,2 - d] imidazol-4-one.

References Cited

Patterson et al. The Ring Index, 2nd ed., p. 360, Washington, D.C., Amer. Chem. Soc., 1960 QD291. p. 3.

Supplement III to the second edition of the Ring Index, pp. 166–7, Washington D.C., Amer. Chem. Soc., 1965, QD291. p. 3.

HENRY R. JILES, Primary Examiner

NATALIE TROUSOF, Assistant Examiner

U.S. Cl. X.R.

260—293.4, 294.7, 307, 309, 566, 590; 424—267, 273

UNITED STATES PATENT OFFICE
CERTIFICATE OF CORRECTION

Patent No. 3,485,846

December 23, 1969

Eugene E. Galantay

It is certified that error appears in the above identified patent and that said Letters Patent are hereby corrected as shown below:

In the heading to the printed specification, lines 3 and 4, "Mount Kemble Lake M.R. 18, Morristown, N. J. 07960" should read -- Morristown, N. J., assignor to Sandoz-Wander, Inc., Hanover, N. J., a corporation of Delaware --.

Signed and sealed this 2nd day of June 1970.

(SEAL)
Attest:

Edward M. Fletcher, Jr.
Attesting Officer

WILLIAM E. SCHUYLER, JR.
Commissioner of Patents